(12) United States Patent
Neil et al.

(10) Patent No.: US 8,147,669 B2
(45) Date of Patent: Apr. 3, 2012

(54) REFLECTIVE OPTICAL SYSTEMS AND THEIR FABRICATION

(75) Inventors: Iain Alexander Neil, Commugny (CH);
Robert Banham, Woodbridge (GB);
John Earl Hill, Livermore, CA (US);
Guiseppe Valsecchi, Oggiono (IT)

(73) Assignee: Media Lario S.R.L., Bosisio Parini (IT)

( * ) Notice: Subject to any disclaimer, the term of this patent is extended or adjusted under 35 U.S.C. 154(b) by 538 days.

(21) Appl. No.: 12/306,466

(22) PCT Filed: Jul. 2, 2007

(86) PCT No.: PCT/EP2007/005854
§ 371 (c)(1),
(2), (4) Date: Jun. 23, 2009

(87) PCT Pub. No.: WO2008/000520
PCT Pub. Date: Jan. 3, 2008

(65) Prior Publication Data
US 2009/0314646 A1 Dec. 24, 2009

(30) Foreign Application Priority Data
Jun. 30, 2006 (EP) .................................... 06425455

(51) Int. Cl.
*C25D 1/00* (2006.01)
*G02B 5/00* (2006.01)

(52) U.S. Cl. .......................................... 205/79; 359/894
(58) Field of Classification Search ................... 205/71, 205/79; 359/515, 838, 894
See application file for complete search history.

(56) References Cited

U.S. PATENT DOCUMENTS

| | | | |
|---|---|---|---|
| 3,790,257 A | 2/1974 | Goldstein | |
| 4,678,691 A * | 7/1987 | Herbert et al. | ............... 428/34.1 |
| 5,810,469 A | 9/1998 | Weinreich | |
| 6,060,702 A | 5/2000 | Simpson | |
| 2002/0036829 A1 | 3/2002 | Ohgane | |
| 2004/0144653 A1 | 7/2004 | Jerominek et al. | |
| 2005/0141112 A1 | 6/2005 | Valenzuela et al. | |

FOREIGN PATENT DOCUMENTS

EP 1152555 A1 11/2001
* cited by examiner

*Primary Examiner* — Luan Van
(74) *Attorney, Agent, or Firm* — Opticus IP Law PLLC

(57) ABSTRACT

A process for fabricating a reflective optical system is disclosed that includes providing first and second mandrels that form a mandrel assembly, and positioning the mandrel assembly in an electroforming bath. The process also includes performing an electroforming operation for a predetermined period, thereby forming an optical system on the mandrel assembly. The process further involves separating the mandrel assembly from the optical system. The resulting optical system is reflective and has at least first and second elongate hollow sections each having an axis corresponding to the axis of elongation of a respective mandrel. The reflective optical system may be used as an afocal relay and used in lithography applications.

32 Claims, 12 Drawing Sheets

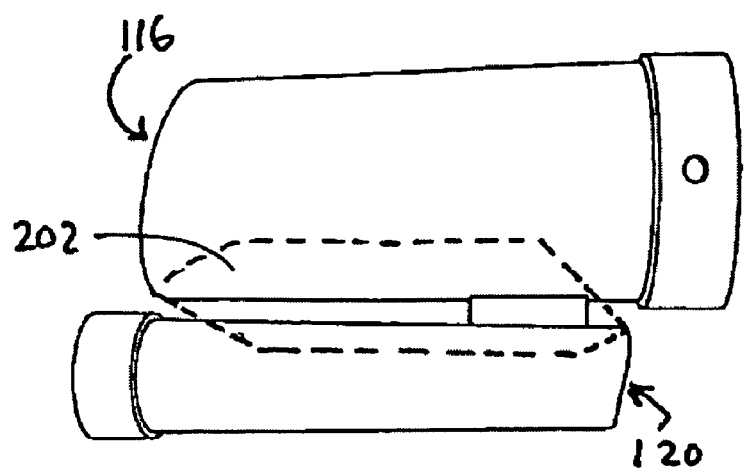
Fig. 2(a)
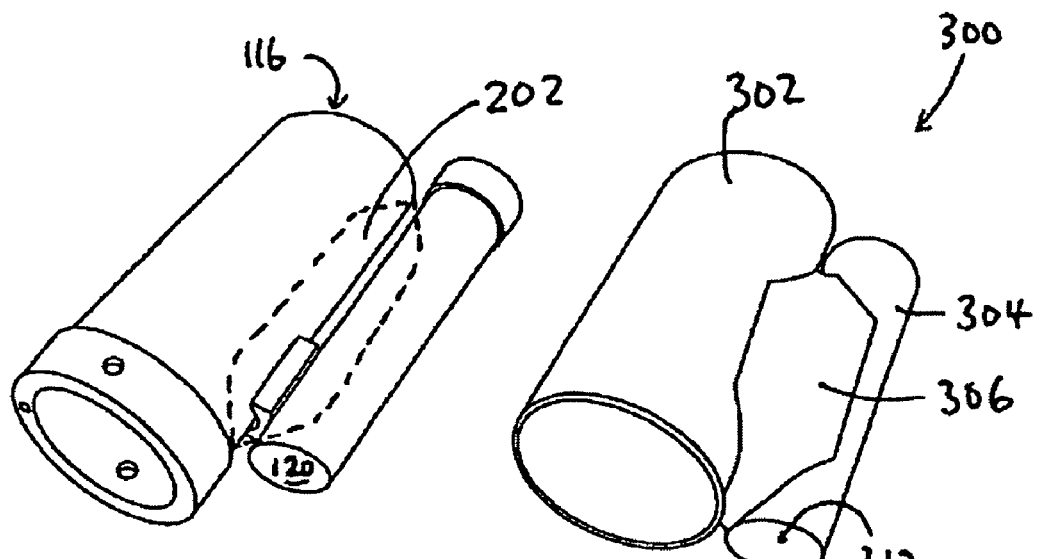
Fig. 2(b)
Fig. 3(a)

REFLECTIVE OPTICAL SYSTEMS AND THEIR FABRICATION

This is a PCT US national stage entry of PCT/EP2007/005854 filed Jul. 2, 2007, published Jan. 3, 2008, as WO 2008/000520, and claims Paris priority to EP application EP 06425455 filed Jun. 30, 2006.

The present invention relates to reflective (mirror based) optics, and more particularly to optical systems and their fabrication.

The advent of multi-spectral and hyper-spectral imaging systems employing modern sensors has created a demand for optical systems that transmit radiation at several wavelengths and in and across several wavebands, for example; near ultraviolet (380-435 nm), visible (435-656 nm), near infrared (NIR, 656-1500 nm), medium IR (MIR, 3-5 µm), long IR (FIR, 8-13 µm), etc., and combinations thereof. In terms of chromatic aberration, mirror systems are preferred because unlike refractive (powered) systems they produce no chromatic aberrations either within a waveband or within and across many wavebands.

Applications of such technologies include surveillance (e.g. corporate, commercial, municipal, etc.), communication (e.g. free space optics for data transmission including infotainment, etc.) automotive (e.g. ranging for anti-collision, auto distancing, etc.), consumer electronics (camcorders, point and shoot cameras, compact cameras, cell phones/PDAs, binoculars), and entertainment (motion pictures, music videos, television shows, commercial advertising).

For systems including the aforementioned, prior art systems depend on contemporary reflective optics, such as polished glass, diamond turned metals including aluminium and beryllium and silicon carbide. Systems using refractive optics are possible, but are confined to apertures up to about 250 mm, and are hindered by material availability, small selection with limited design flexibility and high cost. Known solutions involve either a first substantially reflective optical unit to reduce the collected aperture to a second substantially refractive optical unit of smaller aperture which forms an image, or, a single substantially reflective optical unit which forms an image.

For most applications where mirrors are utilized, two or more mirrors are necessary to maintain the same incoming and outgoing radiation direction.

A problem with known systems is that, for multiple mirror arrangements, their assembly and alignment involve high additional time, effort and cost. To achieve a high performance, cost effective mirror solution with the preferred characteristics, the elimination of assembly and alignment costs is highly desirable. A further problem with conventional techniques is the associated amount of engineering time, effort and cost.

It is known to fabricate electroformed (E-formed) mirrors by galvanic means. However, surface shape accuracy with image quality degradation due to the fabrication process, especially stress relief surface deformation which occurs after removal of the mirror(s) from the mandrel(s) or master(s), may be unacceptable.

A further problem is that, after individual E-formed mirrors have been produced, there are substantial technical difficulties and costs associated with assembling and aligning them. In particular, the individual mounting of E-formed mirrors together in an assembly can cause warping or distortion of the mirror surface shapes, thus degrading image quality and the accurate alignment of the mirrors dictates expensive alignment and test fixtures. Also, even assuming that assembly and alignment are possible, many parts need to be designed, separately made and utilized, which can be expensive.

A further problem is that in existing systems of unobscured normally off-axis mirror systems, the aforementioned complexity and associated cost becomes even greater than in axially symmetric mirror systems, because the incoming and exiting optical axis may be non-aligned both in position and angle. However, if achievable then optimal diffraction limited performance can be obtained.

The present invention seeks to address the aforementioned and other issues.

According to one aspect of the present invention there is provided a process for fabricating a reflective optical system, comprising: (a) providing at least a first mandrel and a second mandrel, each mandrel having an axis of elongation and having at one end thereof a negative end surface defining in negative shape a reflective surface, (c) rigidly and releasably attaching the first mandrel and the second mandrel to each other, thereby forming a mandrel assembly; (d) positioning the mandrel assembly in an electroforming bath and performing an electroforming operation for a predetermined period, thereby forming an optical system on the mandrel assembly; and (e) separating the mandrel assembly from the optical system, the optical system thereby having at least first and second elongate hollow sections, wherein each hollow section has an axis corresponding to the axis of elongation of a respective mandrel, wherein each hollow section has a first end, at which a reflective surface corresponding to the negative end surface of a respective mandrel is disposed, and a second end, the second ends being open, and wherein the axes of said at least first and second hollow sections are oriented whereby an optical path is defined between said second ends via reflections at said reflective surfaces.

Preferably the process further comprises (b) providing a connecting portion, the connecting portion including at least one attachment member; and wherein (c) comprises using said at least one attachment member.

Preferably, (b) includes providing an intermediate mandrel disposed between the first and second mandrels and extending between the ends thereof having said negative surfaces, whereby the fabricated optical system includes an intermediate section extending between said first and second hollow sections and providing an optical path between said first and second reflective surfaces.

Preferably, (d) comprises forming the optical system on the exterior of the mandrel assembly.

The orientations of adjacent mandrels may be reversed and the axes of elongation of the mandrels is arranged whereby the negative end surfaces of said at least first and second mandrels are substantially opposing In one embodiment, the axes of elongation of adjacent mandrels are substantially parallel.

Preferably, each mandrel is of circular cross-section.

In one embodiment, the negative surfaces of said at least first and second mandrels are substantially conical. Preferably, the outer surfaces define a cone angle of about 1 to about 5 degrees.

In one embodiment, the outer surfaces of said at least first and second mandrels are substantially cylindrical.

Preferably, the electroforming material in the electroforming bath has a different thermal coefficient of expansion to that of the mandrels.

The intermediate mandrel may include one or more leaf portions, bent and attached to the first and second mandrels at least adjacent the ends thereof having the negative surfaces.

Preferably, the or each leaf portion comprises a portion formed from metal foil or plate, for example aluminium foil or plate.

Alternatively, the intermediate mandrel includes a mouldable and curable material, moulded and attached to the first and second mandrels at least adjacent the ends thereof having the negative surfaces. The mouldable material may comprise a polymer or resin material containing conductive particles. Alternatively, the process may include coating a conductive film or layer onto the mouldable material.

Preferably, the attachment member includes a locating member and (c) includes locating the first and second mandrels using the locating member. Preferably, the attachment member includes a locking member, and (c) includes attaching the locking member to the locating member in releasable abutment.

The first mandrel and/or the second mandrel may be shaped such that the surfaces thereof upon which material is electroformed during said electroforming operation are substantially cylindrical or substantially conical.

The first mandrel and/or the second mandrel may be shaped such that the negative surfaces thereof are piano, spherical, conical, general asphere, toroidal a grating, or a fly eye mirror.

In certain embodiments, each mandrel has an open end and, at the end thereof opposite said open end, a negative end surface defining in negative shape a reflective surface According to another aspect of the present invention there is provided a reflective optical system obtainable by the method of any of the preceding claims.

According to another aspect of the present invention there is provided a reflective optical system, comprising: at least first and second electroformed elongate hollow sections, each hollow section having an axis of elongation, and each hollow section having an open end and, at the end thereof opposite said open end, a reflective surface; wherein the axes of said at least first and second hollow sections are oriented whereby an optical path is defined between said open ends via reflections at said reflective surfaces.

The optical system preferably includes an intermediate section, providing said optical path between said first and second reflective surfaces.

Preferably, said at least first and second hollow sections are integrally electroformed.

Preferably, the intermediate section is integrally electroformed with one or more of said at least first and second hollow sections.

In one embodiment, the orientations of hollow sections is reversed and the axes of elongation of the hollow sections is arranged whereby the reflective surfaces of said at least first and second hollow sections are substantially opposing In one embodiment, the axes of elongation of adjacent mandrels are substantially parallel.

Preferably, the hollow sections are each of circular cross-section. The first hollow section and/or the second hollow section may be substantially cylindrical or substantially conical.

In one embodiment, the first hollow section and/or the second hollow section is substantially conical. Preferably, the first hollow section and/or the second hollow section have a cone angle of about 1 to about 5 degrees.

The reflective surface of said first hollow section and/or the reflective surface of said second hollow section may be piano, spherical, conical, general asphere, toroidal or a grating.

Alternatively, the reflective surface of said first hollow section and/or the reflective surface of said second hollow section may be a fly-eye mirror arrangement comprising multiple reflective portions. The reflective portions may be equal or non-equal in size by area, and may point in the same or different directions. The surface profile of said multiple reflective portions may be identical, and may be piano, spherical, conical, general asphere, toroidal or a grating. Alternatively, the reflective portions may have non-identical surface profiles.

According to another aspect of the invention there is provided a process for fabricating a reflective optical system, comprising: (a) providing at least a first mandrel and a second mandrel, each mandrel having an axis of elongation and having an open end and, at the end thereof opposite said open end, a negative end surface defining in negative shape a reflective surface, (c) rigidly and releasably attaching the first mandrel and the second mandrel to each other, thereby forming a mandrel assembly; (d) positioning the mandrel assembly in an electroforming bath and performing an electroforming operation for a predetermined period, thereby forming an optical system on the mandrel assembly; and (e) separating the mandrel assembly from the optical system, the optical system thereby having at least first and second elongate hollow sections, wherein each hollow section has an axis corresponding to the axis of elongation of a respective mandrel, wherein each hollow section has a first end, at which a reflective surface corresponding to the negative end surface of a respective mandrel is disposed, and a second end, the second ends being open, and wherein the axes of said at least first and second hollow sections are oriented whereby an optical path is defined between said second ends via reflections at said reflective surfaces.

According to another aspect of the invention there is provided a reflective optical system, comprising: at least first and second electroformed elongate hollow sections, each hollow section having an axis of elongation, and each hollow section having an open end and, at the end thereof opposite said open end, a reflective surface; wherein the axes of said at least first and second hollow sections are oriented whereby an optical path is defined between said open ends via reflections at said reflective surfaces.

In accordance with embodiments of the invention is the fabrication of an optical system employing at least two E-formed mirrors in a monolithic component formation, where the mirrors and their connecting structure(s), which may be themselves be electroformed, are preferably formed by one material (although each mirror and its connecting structure(s) may be formed from different materials). The most basic arrangement of the invention comprises the use of two mandrels (to produce two mirrors) connected together by suitable means, for example (but not necessarily) with an additional connecting structure. The invention is, for example, particularly beneficial in relation to dual mirror systems for image-forming applications.

An advantage of the invention is that it provides high performance, cost effective multi-mirror imaging or afocal non-imaging system solutions utilizing substantially the E-formed mirror process.

Benefits and features of the invention include a significantly cost effective, high performance multi-mirror imaging solution as compared to conventional glass polished, diamond turned metallic, silicon carbide and conventional E-formed mirror substrates. The major cost savings and high performance offered by the invention are derived from the substantial reduction, and in some cases elimination, of the assembly and alignment tasks.

Other advantages of the invention include the following.

Substantial reduction in number of total parts, with associated design, engineering and fabrication cost reduction.

Diffraction limited performance and high transmission in off-axis unobscured mirror configurations.

Unitary construction with high rigidity and reduced vibration sensitivity.

Passively athermal design arrangement.

Increased suitability for multiple discrete field of view and zoom optics radiation throughput.

Readily permits attachment of a front window for system sealing.

Provides in-built baffles to reduce veiling glare and spurious light throughput.

In off-axis unobscured mirror configurations, eliminates undesirable 'spider type' supporting structures which reduce thermal resolution in IR wavebands and reduce contrast in non-IR wavebands.

Configurable for all radiation input and output arrangements, for example afocal, objective, relay, etc.

Thin material structure with respect to overall structural dimensions provides low weight.

A further application of the invention is in lithography optical systems which operate in the extreme ultraviolet waveband (EUV; 13.5 nm). Here, there is a performance requirement to provide a near constant radiation energy density or flux across an illuminated silicon wafer target at which an image is formed. Embodiments of the present invention provides a process which is suitable to form an optical system, either in whole or in part, to meet this requirement. In particular, to optimise the desired performance at least one of the reflective surfaces preferably has multiple mirror portions, normally known as a fly-eye arrangement, which redirect the radiation in a predetermined manner. Ideally, each of these multiple reflective portions have surfaces oriented differently, such that the reflected radiation is pointed in the optimal directions.

As referred to herein, the at least first and second mandrels comprise optical mandrels, as are known to persons skilled in the art, i.e. they include at least one surface shaped and conditioned to correspond to a reflective surface in the resulting optical system, whereas the intermediate mandrel does not necessarily incorporate such surface and may comprise a simple mandrel of the non-optical type.

Further, references herein to "negative surface" are, unless stated otherwise, references to negatively shaped surfaces, which in turn have corresponding positively shaped surfaces. The expression "negative surface" accordingly does not make any inference with regard to the optical power of the surface; the latter may be positive (convex) or negative (concave) or zero (piano), as appropriate, in accordance with the optical design of the resulting optical system.

Embodiments of the invention will now be described in detail, by way of example, with reference to the accompanying drawings, in which:

FIG. 2 shows a mandrel assembly of FIG. 1, (a) in side view and (b) in front perspective view;

Figure 4:
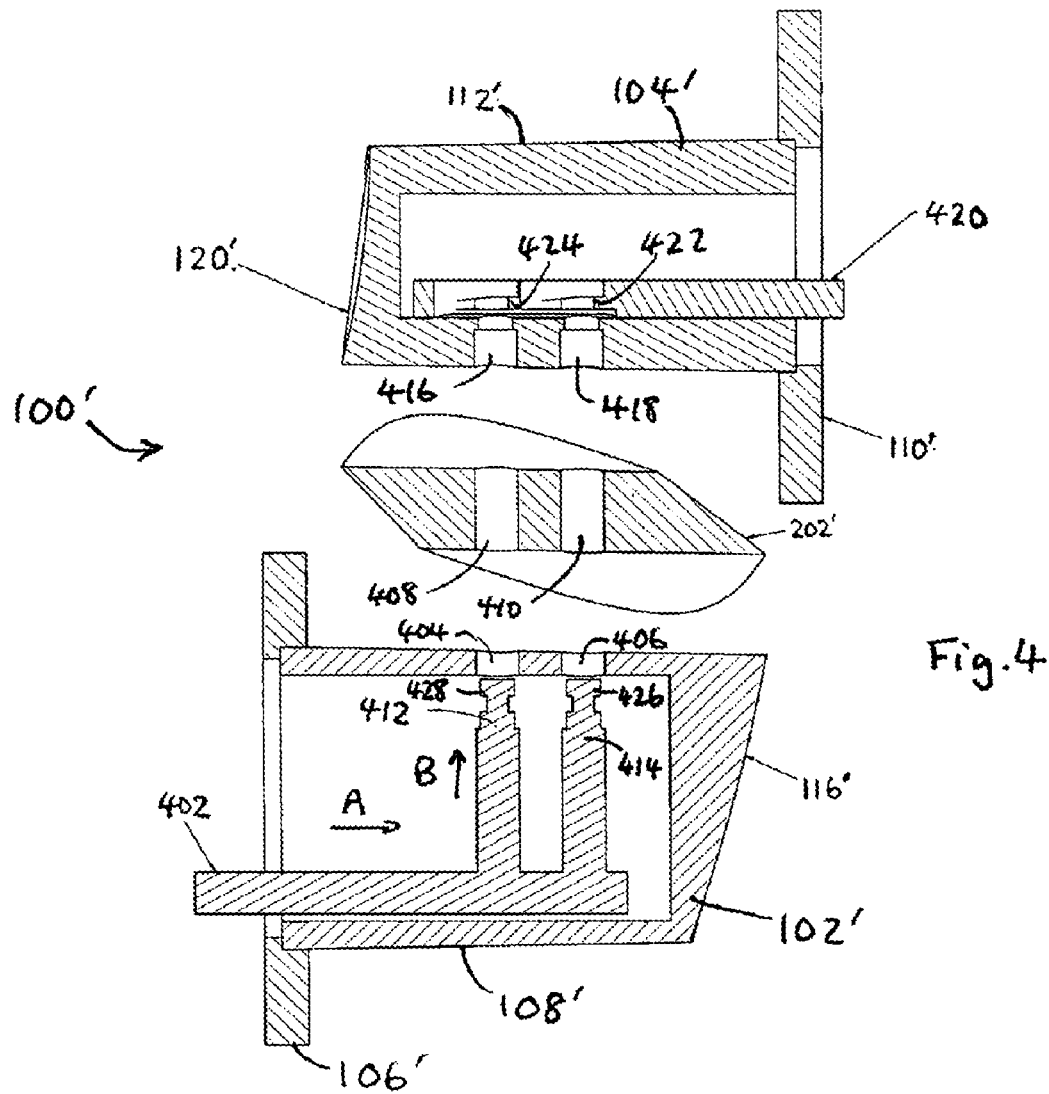
FIG. 4 is a cross-sectional view showing, disassembled, a mandrel assembly used in an optical system fabrication process according to a second embodiment of the invention.
Figure 8:
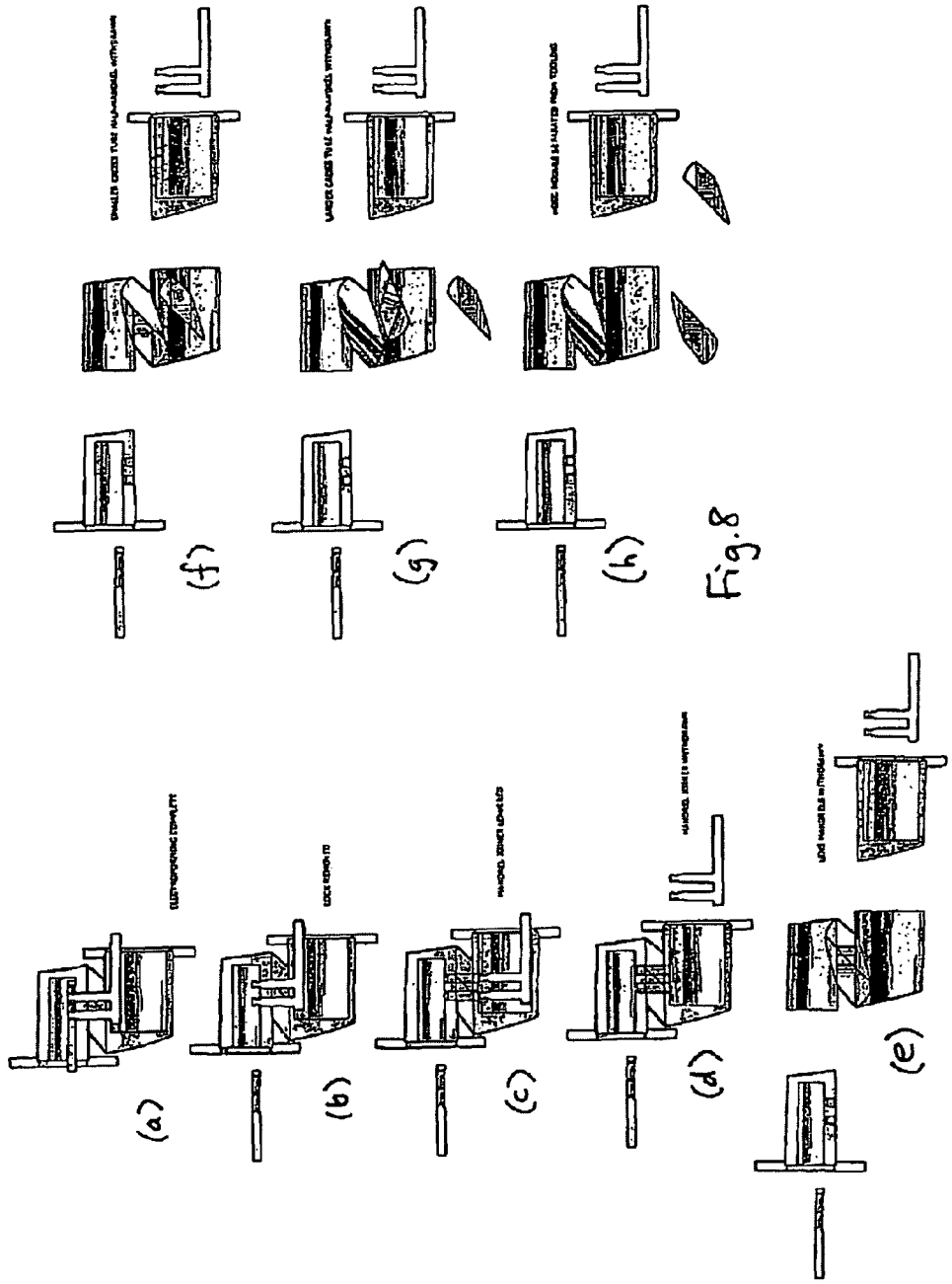
Figure 9:
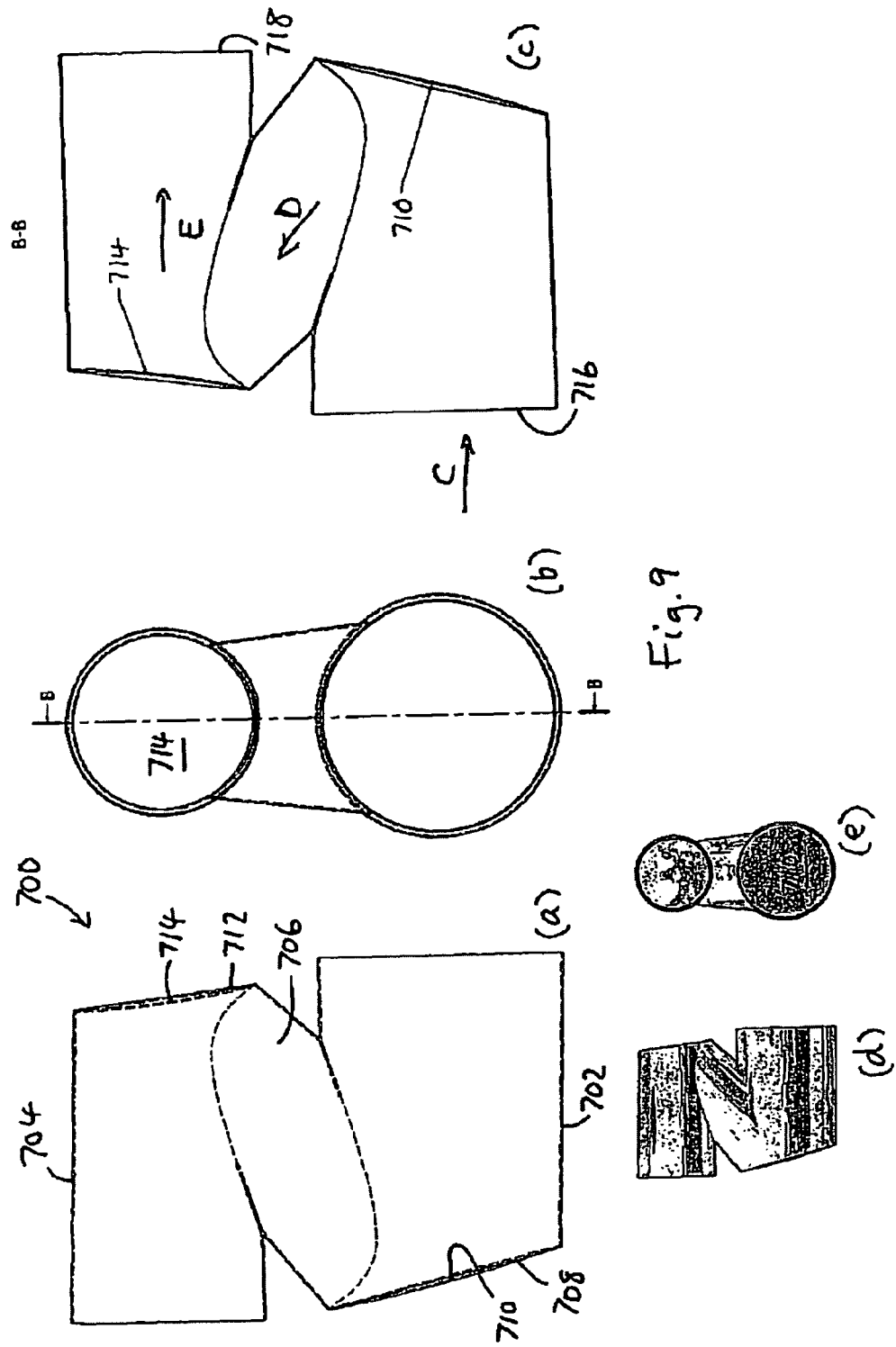
Figure 11:
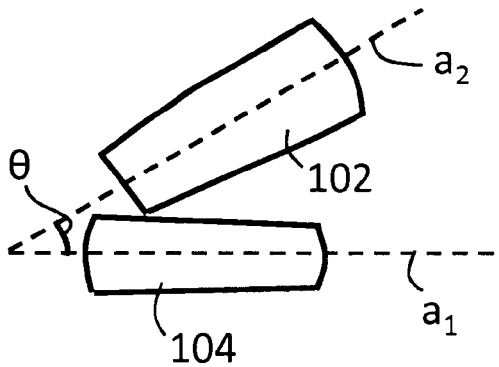
Figure 12A:
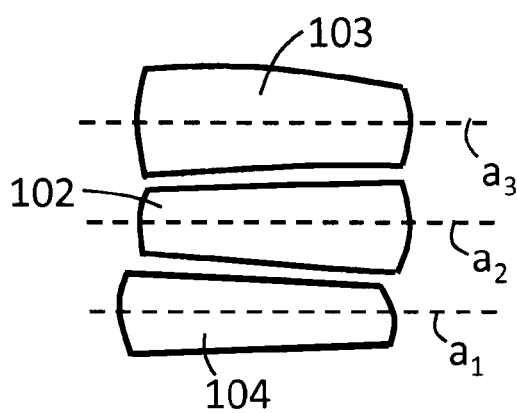
Figure 12B:
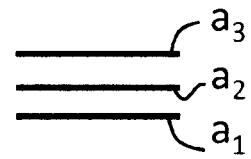
Figure 12C:
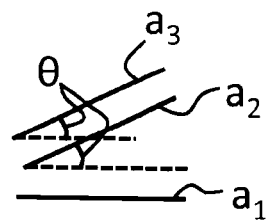
Figure 12D:
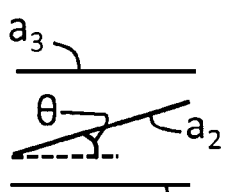
Figure 12E:
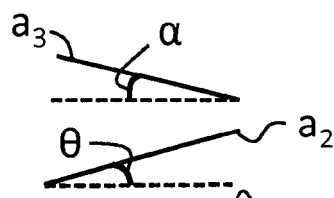
Figure 12F:
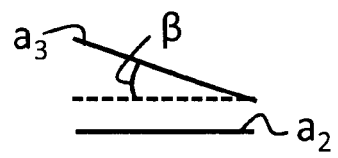

FIG. 8 provides various view, in sequence, showing disassembly of the mandrel assembly of FIG. 4 and removal of the fabricated optical system;

FIG. 9 shows further, more detailed, views of the fabricated optical system in FIG. 8;

FIGS. 10(*a*) to 10(*c*) show various means for attaching adjacent mandrels releasably together, according to further embodiments of the invention;

FIG. 11 shows the relative disposition of mandrel axes, for a two-mandrel system; and FIGS. 12 (*a*) to 12(*f*) show the relative disposition of mandrel axes, for a three-mandrel system.

In the description and drawings, like numerals are used to designate like elements. Unless indicated otherwise, any individual design features and components may be used in combination with any other design features and components disclosed herein.

Figure 1A:
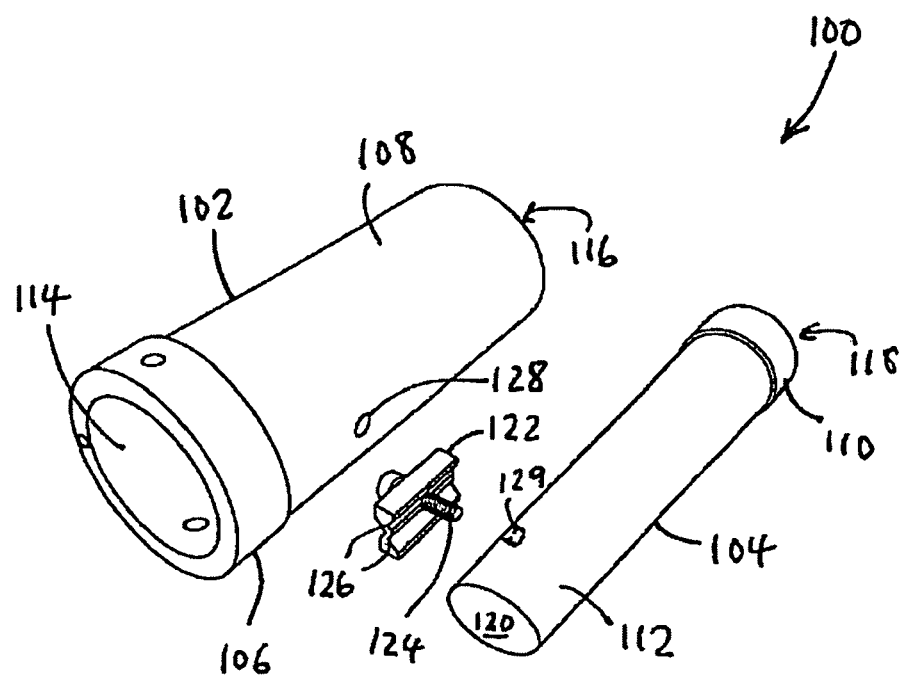
FIG. 1 shows, disassembled, a mandrel assembly used in an optical system fabrication process according to a first embodiment of the invention, (a) in front perspective view and (b) in side view.
Figure 1B:
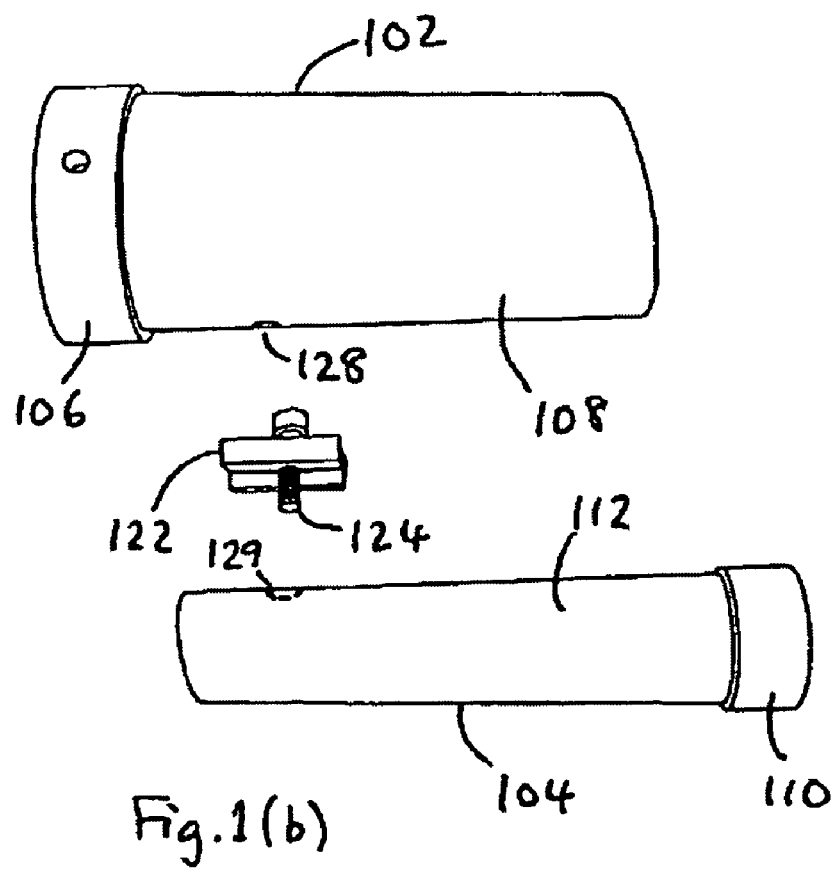

FIG. 1 shows, disassembled, a mandrel assembly 100 used in an optical system fabrication process according to a first embodiment of the invention, (a) in front perspective view and (b) in side view. The mandrel assembly 100 includes first mandrel 102 and a second mandrel 104. In this case, the first mandrel 102 is larger than the second mandrel 104, however, they may be of the same size, or substantially the same size. In this embodiment, the external diameter is several centimetres; however, the external diameter may be of any suitable size to suit a particular application. Suitably, the mandrels 102 and 104 are made of aluminium or any other material having a suitable coefficient of thermal expansion (discussed later). The mandrels 102 and 104 are shaped using any suitable combination of machining, grinding and polishing, or other techniques well know to persons skilled in the art. In this embodiment, the outer surfaces of the mandrels 102 and 104 are conical in shape, with a small cone angle (e.g. 1 to 5 degrees). However, other shapes, including cylindrical, may be used.

The first mandrel 102 includes a raised section 106 and a larger section onto whose surface 108 metal is deposited in the electroforming operation during the fabrication process, discussed later. Similarly, the second mandrel 104 includes a raised section 110 and a larger section onto whose surface 112 metal is deposited in the electroforming operation during the fabrication process.

The first mandrel 102 includes an end aperture 114 at one end and a negative surface 116 (defining, in negative, a first reflective surface or mirror element) at the other end thereof. Similarly, the second mandrel 104 includes an end aperture 118 at one end and a negative surface 120 (defining, in negative, a second reflective surface or mirror element) at the other end thereof. (Although referred to as "end apertures" 114, 118, such apertures may or may not be open to the ambient atmosphere; that is, the apertures are sufficiently optically open to receive radiation, and therefore may be open to the atmosphere or sealed with an optically transmissive element, such as a glass, Perspex, zinc sulphide, or other form of plate or filter element, the optically transmissive element being able to pass all EM radiation or any band or bands of such radiation, depending on the application.)

Further, although negative surfaces 116 and 120 are suitably spherical, they may (depending on requirements) have other suitable shapes. Alternatively, through suitable processing (i.e. machining, grinding) negative surfaces 116 and 120 may be negatives of a fly-eye mirror arrangement comprising multiple reflective portions.

To assemble the mandrel assembly 100, a metal spacer 122 and a bolt 124 are used. The spacer 122 is made of suitable metal such as stainless steel, and is machined so as to have recesses 126 precision shaped to accommodate and abut the surfaces 108 and 112 of the mandrels 102 and 104 respectively. The bolt 124 passes from within the mandrel 102, through machined hole 128, through the spacer 122, and then through a further bolt hole 129 in the mandrel 104, then to be secured by a nut or thread (not shown) within the mandrel 104.

Optionally, a mechanical frame (not shown), for example a U-shaped or J-shaped frame, for example made of steel and of sufficient thickness to provide rigid structure, is alternatively or additionally attached to the mandrels 102 and 104, to secure then together. The frame is suited to re-use in mass production and in precision alignment of the mandrels. See FIGS. 10(a) to 10(c), discussed hereinafter.

FIG. 2 shows a mandrel assembly 100 of FIG. 1, (a) in side view and (b) in front perspective view. This illustrates the step of forming an intermediate mandrel 202 on the mandrel assembly 100: this causes, during the electroforming operation, a connecting portion, defining an inner hollow passage or optical path (not shown), to be formed in the resulting optical system, as discussed later.

The intermediate mandrel 202 is suitably formed by fixing (e.g. by adhesive) a conductive foil or thin plate (e.g. Aluminium, or other similar suitable material) onto the two attached mandrels 102 and 104. Alternatively, the intermediate mandrel 202 may be suitably formed by applying a mouldable material, such as, resin, polymer or adhesive, to form the initial shape; thereafter, the material is coated by metallic paint, foil, or other conductive coating, thus providing a conductive surface onto which metal may then be electroformed.

Once assembled, the mandrel assembly 100 is used to fabricate the optical system. A reflective layer, for example a gold layer to a thickness of 100 nm is formed on each of the negative surfaces 116 and 120 of the mandrels, using techniques known to persons skilled in the art. However, it will be appreciated that any thickness as low as 10 nm, or in the range 10 to 200 nm, and more particularly 10 to 100 nm may be used, depending on the application, i.e. 100 nm for visible, 200 nm for x-ray.

Next, the mandrel assembly 100 is placed in an electroforming bath (not shown), and an electroforming operation performed, using electroforming techniques known to persons skilled in the art. In this embodiment, the electroforming material is nickel, and the electroforming is performed at about 50 degrees C. However, other materials (and pairings of mandrel and electroforming materials), may be used, the material (pairs) being such that they have a different, and preferably significantly different, coefficient of thermal expansion, so as to facilitate separation post-electroforming (see below).

Figure 3B:
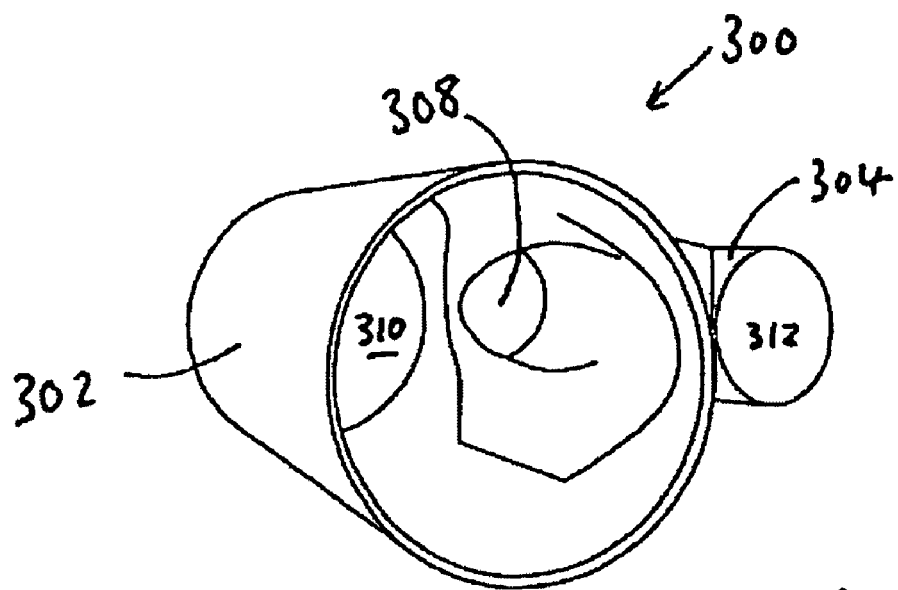
FIG. 3 depicts an optical system fabricated using the mandrel assembly of FIG. 1, (a) in front perspective view and (b) in front view.

FIG. 3 depicts an optical system 300 fabricated using the mandrel assembly 100 of FIG. 1, (a) in front perspective view and (b) in front view, after separation. The optical system 300 includes a first (large) section 302, a second section 304, and an intermediate section 306, the latter enclosing the inner optical path 308 (FIG. 3(b)) between the inner mirrors or reflective surfaces 310 and 312.

In this embodiment, the optical system 300 is separated from the mandrel assembly 100 by cooling the whole, by suitable means such as water cooling or air cooling. The effect of the difference in thermal expansion coefficient means that the aluminium mandrel shrinks relative to the optical system, allowing the parts to be separated. The bolt 124 is unscrewed, releasing spacer 122 and enabling separation of the intermediate mandrel 202, each of which can simply drop out of the optical system 300.

Alternatively (depending on the materials), the optical system 300 is separated from the mandrel assembly 100 by heating the whole, by suitable means such as an oven.

Figure 5:
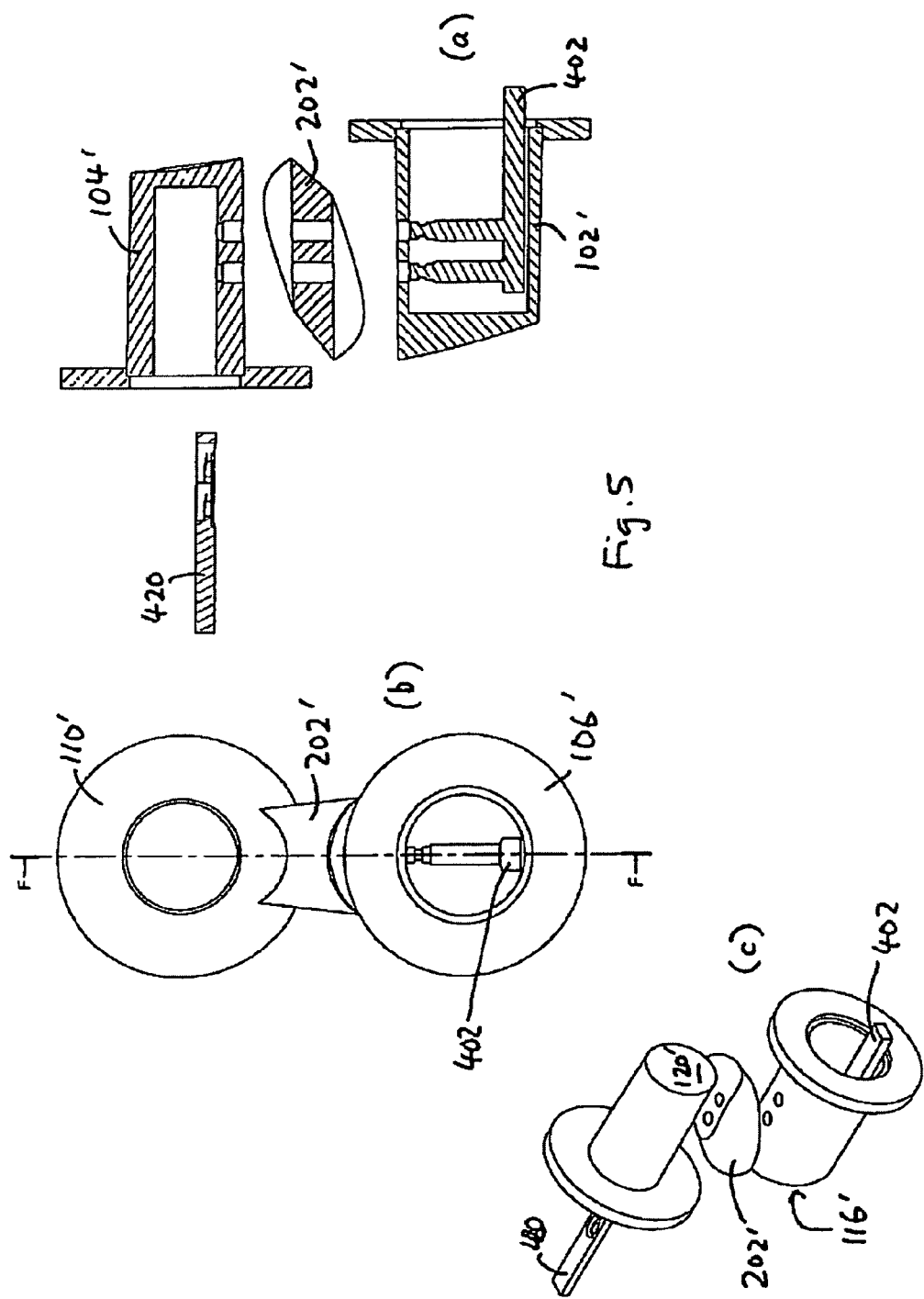
FIG. 5 shows further views of the mandrel assembly of FIG. 4, disassembled.
Figure 6:
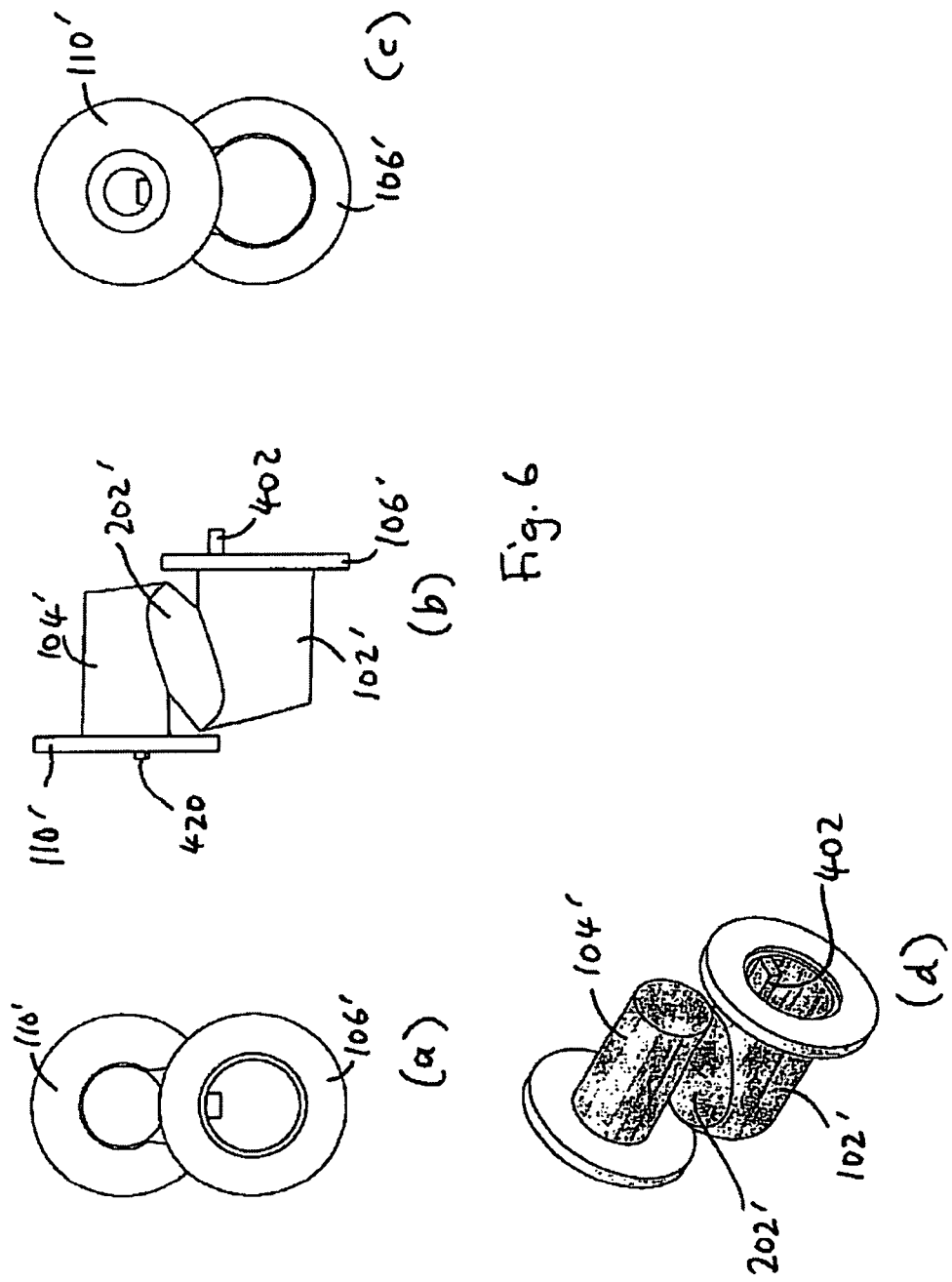
FIG. 6 shows further views of the mandrel assembly of FIG. 4, when assembled.

FIG. 4 is a cross-sectional view showing, disassembled, of a mandrel assembly 100' used in an optical system fabrication process according to a second embodiment of the invention. This is the same as in the first embodiment, except as described below. FIG. 5 shows further views of the mandrel assembly of FIG. 4, disassembled. FIG. 6 shows further views of the mandrel assembly of FIG. 4, when assembled.

Referring to FIGS. 4 to 6, in this embodiment, during assembly, a locating tool 402 is inserted into mandrel 102' in the direction A, then (in the direction of arrow B), through alignment holes 404, 406 in the mandrel 102'. In this case, the intermediate mandrel 202' has through holes 408, 410, through which the prongs 412, 414 of the alignment tool 402 pass, until they finally pass through receiving holes 416, 418 in the second mandrel 104'. A locking member 420 is passed into the (upper) second mandrel 104'. Once the prongs 412, 414 have fully travelled in the direction of arrow B, the locking member is moved into position to secure the alignment member: here, the shoulders 422, 424 engage and abut the lower side of head 426, 428 at the ends of the prongs 412,414. Thus, the mandrels 102', 104' are securely attached to each other in alignment, by means of alignment member 402 and locking member 420.

Figure 7:
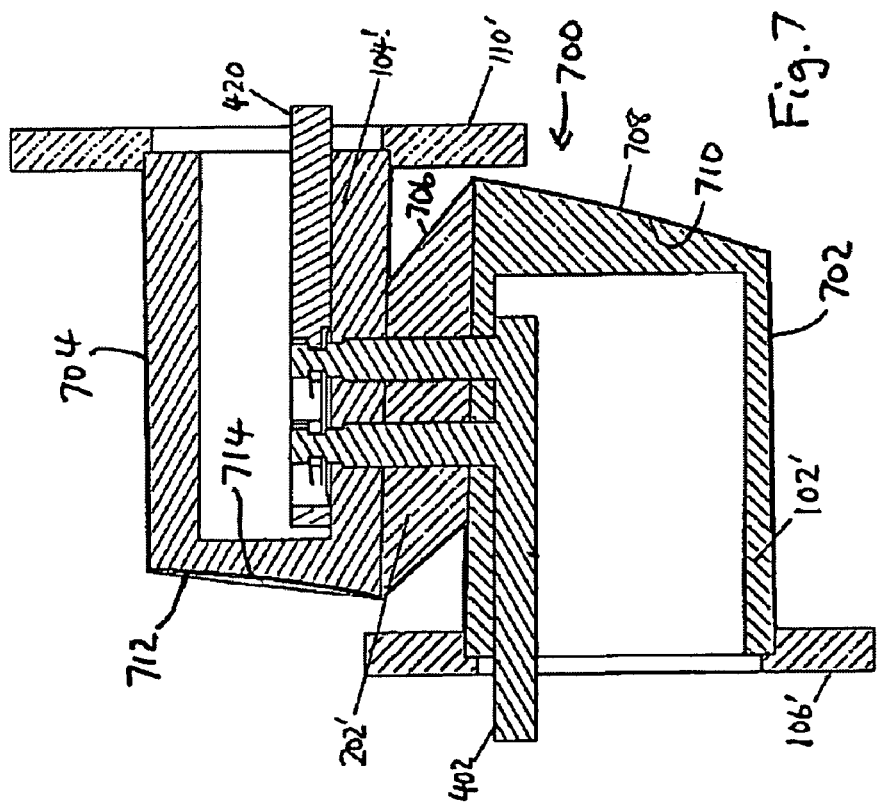
FIG. 7 shows the mandrel assembly of FIG. 4 following electroforming, during the optical system fabrication process according to a second embodiment.

FIG. 7 shows the mandrel assembly 100' of FIG. 4 following electroforming, during the optical system fabrication process according to a second embodiment. FIG. 8 provides various views, in sequence, showing disassembly of the mandrel assembly of FIG. 4 and removal of the fabricated optical system. Separation of the mandrel assembly 100' from the optical system 700 following electroforming is essentially the same as in the first embodiment, and involving the reverse of the assembly of the mandrel assembly 100'. FIG. 9 shows further, more detailed, views of the fabricated optical system in FIG. 8.

Referring to FIGS. 7 to 9, the fabricated optical system 700 includes a first (hollow) section 702 and a second (hollow) section 704. The first section 702 includes a first endwall 708 having an (internal) first reflective surface 710, and second section 704 includes a second endwall 712 having an (internal) second reflective surface 714. An intermediate connecting section 706 provides an internal optical path between the first reflective surface 710 and the second reflective surface 714.

The optical system 700 fabricated provides a dual mirror optical system whereby radiation rays entering (arrow C) entry aperture 716 are reflected at first reflective surface 710, pass (generally in the direction of arrow D) to second reflective surface 714. There, they are reflected and pass (generally in the direction of arrow E) out of exit aperture 718. The effect is of optical system 700 is to provide an afocal relay (i.e. collimated radiation in and collimated radiation out). In one embodiment, for example, a 300 mm beam size may be converted to 150 mm beam size.

The exiting radiation may be received at a suitable receiver or sensor (e.g. CCD array, TV/video camera), if necessary via further optics, such as a secondary (refractive) optical system (not shown).

Additional points relating to the E-forming process, with pros and cons, are set out below.

System contains a physical stop or a pupil or pupils or intermediate images which are important to limiting and controlling the radiation path through the system, which is especially important in the 8-13 μm waveband where the detector should only see radiation that falls within the reflective surface apertures, thus providing the highest minimum resolvable temperature difference (MRTD), i.e. is most sensitive to small temperature differences in the object space scene.

Optical baffles that reduce veiling glare caused by scattering and spurious reflections predominantly within the system can be provided within the invention using one or more of the following.
   a). sandblasting of shiny surfaces.
   b). matt black painting or treatment of shiny surfaces, bearing in mind that the surfaces are already present in a monolithic component.
   c). rilling of surfaces, followed by a). and/or b).

Figure 10A:
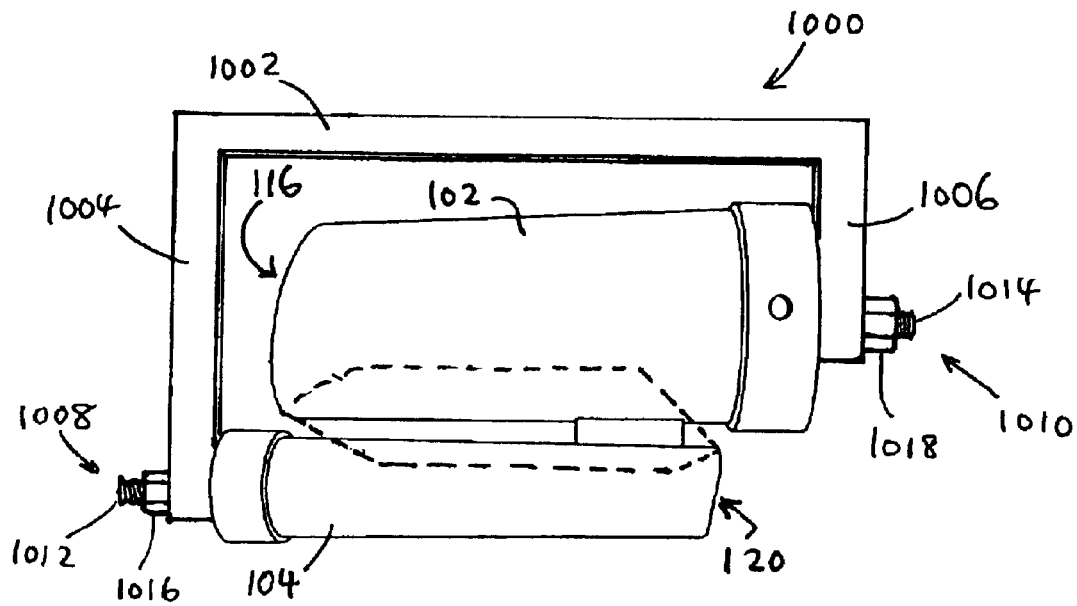
Figure 10B:
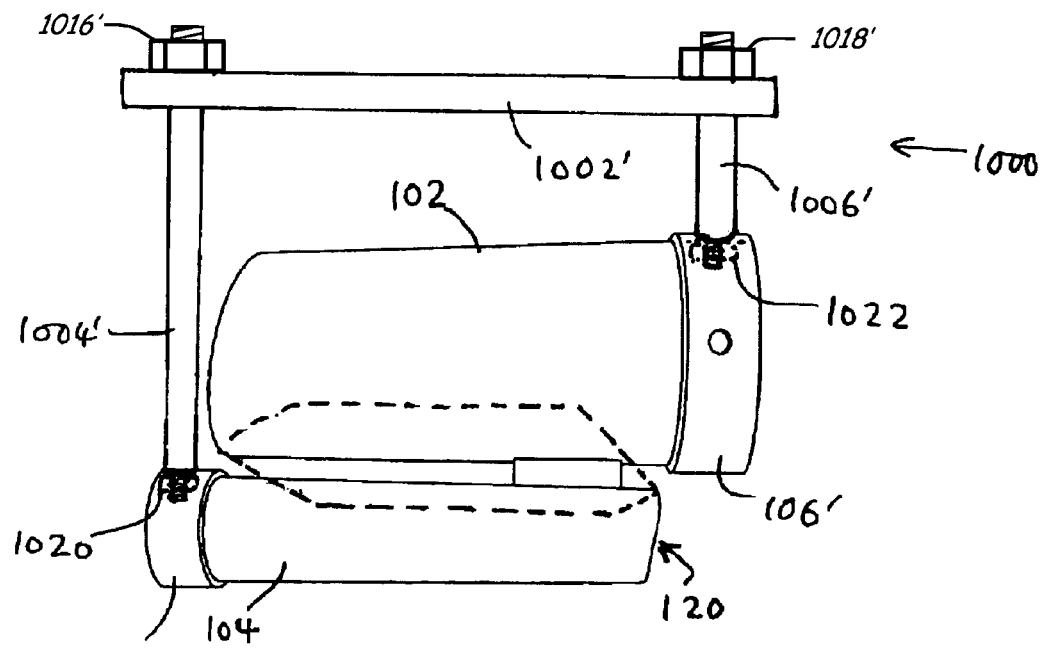
Figure 10C:
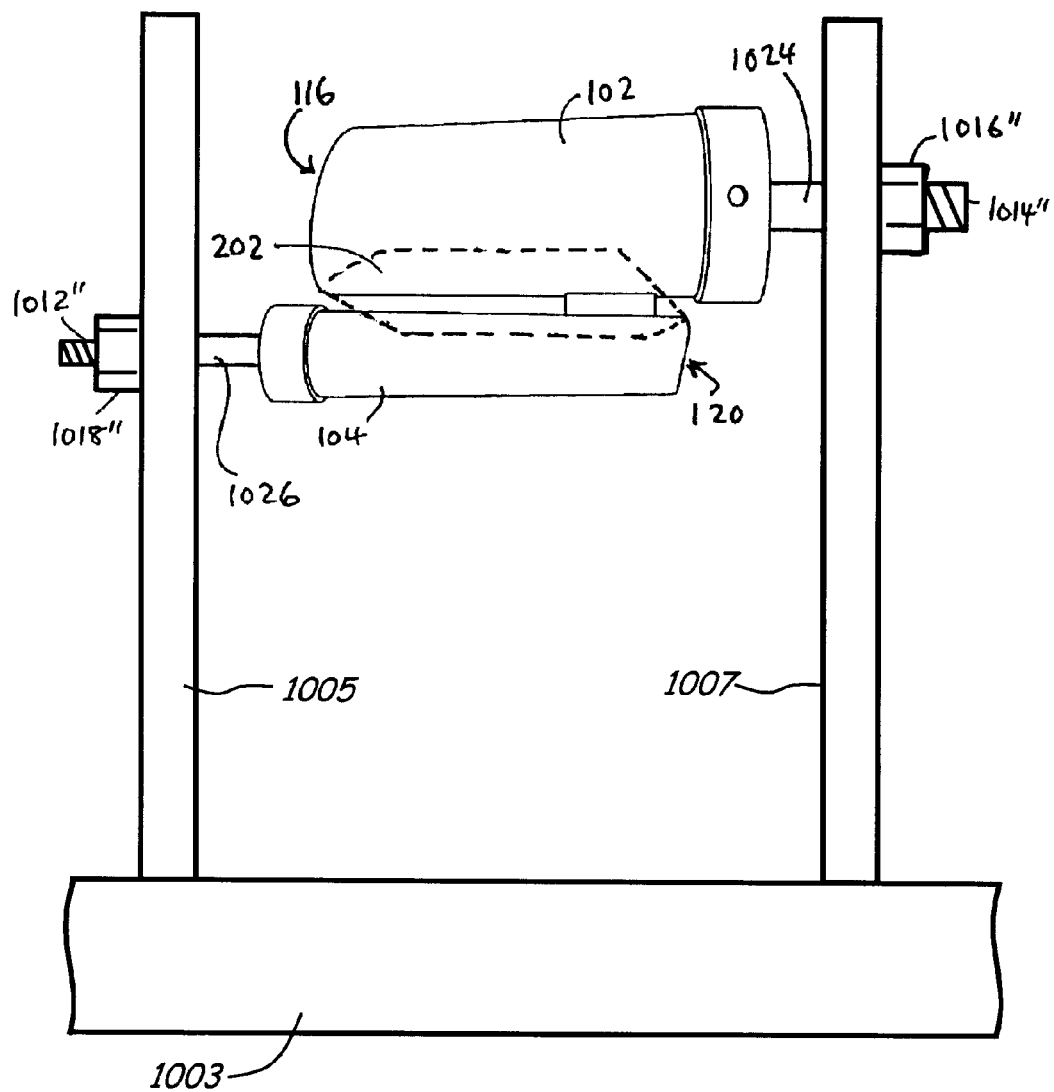

FIGS. 10(a) to 10(c) show various means for attaching adjacent mandrels releasably together, according to further embodiments of the invention. This is the same as the preceding embodiments, except as described below.

Here, the metal spacer 122 and a bolt 124 are omitted. Instead a frame 1000, comprising a main bar 1002 and legs 1004 and 1006 is employed. The frame 1002 is made of suitable metal such as stainless steel, and is machined so as to have channels precision shaped to accommodate attachment members 1008 and 1010.

In one embodiment (FIG. 10(a)), the mandrels 102 and 104 are solid items, with integral, bolt-like, screw-threaded projections 1012 and 1014. The latter enable the mandrels 102, 104 to be rigidly and releasable attached to the frame 1000 using nuts 1016 and 1018. However, in the alternative, the mandrels 102, 104 may be provided with recesses (channels) with internal screw threads (not shown), whereby the attachment members 1008 and 1010 comprise bolts with threads corresponding to those of the channels, enabling attachment to the frame 1000.

In another embodiment (FIG. 10(b)), the mandrels 102 and 104 may be solid or partially hollow items. Here, the frame 1000' comprises main bar 1002' and legs 1004' and 1006'. The frame 1000' is made of suitable metal such as stainless steel, and is machined so as to have channels precision shaped to accommodate legs 1004' and 1006'. Each leg 1004' and 1006' has screw threaded ends, enabling them to be attached to the main bar 1002' using nuts 1016', 1018', and to end sections 106', 110' of the mandrels 102, 104 using bolts 1020, 1022

In yet another embodiment (FIG. 10(c)), the frame 1000" comprises a base 1003 and uprights 1005, 1007. The first mandrel 102, which may be solid, hollow, or solid with small recesses, includes a first projection 1024, having a screw-threaded end 1014". The first mandrel 102 is thus fixedly and releasably mounted in position, attached to the upright 1007, by nut 1018". The second mandrel 104, which may be solid, hollow, or solid with small recesses, includes a second projection 1026, having a screw-threaded end 1012". The second mandrel 104 is thus fixedly and releasably mounted in position, attached to the upright 1005, by nut 1016".

FIG. 11 shows the relative disposition of mandrel axes, for a two-mandrel system. In certain embodiments, the axis a1 of the second mandrel 104 may be substantially parallel to the axis a2 of the first mandrel: this means that the angle θ between the axes a1, a2 may be a small angle or may be zero. The small angle may be for example less than 5 degrees, more preferably less than 2 degrees, and even more preferably, less than 1 degree.

Depending on the application, the angle θ may have any suitable value, to suit the optical design, but is suitably significantly <90 degrees, and typically <45 degrees.

FIGS. 12 (a) to 12(f) show the relative disposition of mandrel axes, for a three-mandrel system. FIG. 12(a) shows the inclusion of a third mandrel 103, and the corresponding axes a1, a2, a3 of the mandrels; and as seen in FIG. 12(b), in this case the axes a1, a2, a3 are substantially parallel. However, as seen in FIGS. 12(c) to 12(f), there are numerous combinations possible for the arrangement of axes, and angles (θ, α, β) between them. Similar considerations apply when more mandrels (axes) are used.

The invention claimed is:

1. A process for fabricating a reflective optical system, comprising:
   (a) providing at least a first mandrel and a second mandrel, each mandrel having an axis of elongation and having at one end thereof a negative end surface defining in negative shape a reflective surface;
   (b) providing an intermediate mandrel disposed between the first and second mandrels and extending between the ends thereof having said negative surfaces;
   (c) rigidly and releasably attaching the first mandrel and the second mandrel to each other, thereby forming a mandrel assembly, the axes of said at least first and second mandrels being non-coincident;
   (d) positioning the mandrel assembly in an electroforming bath and performing an electroforming operation for a predetermined period, thereby forming the optical system on the mandrel assembly; and
   (e) separating the mandrel assembly from the optical system, the optical system thereby having at least first and second elongate hollow sections,
   wherein each hollow section has an axis corresponding to the axis of elongation of a respective mandrel;
   wherein each hollow section has a first end, at which a reflective surface corresponding to the negative end surface of a respective mandrel is disposed, and a second end, the second ends being open; and
   wherein the axes of said at least first and second hollow section are oriented whereby an optical path is defined between said second ends via reflections at said reflective surfaces; and
   whereby said optical system has an off-axis configuration and whereby said optical system includes an intermediate section extending between said first and second hollow sections and providing an optical path between said first and second reflective surfaces.

2. The process of claim 1, wherein (b) includes providing a connecting portion, the connecting portion including at least one attachment member; and wherein (e) comprises using said at least one attachment member.

3. The process of claim 1 wherein (d) comprises forming the optical system on the exterior of the mandrel assembly.

4. The process of any of claim 1 wherein the orientations of adjacent mandrels is reversed and the axes of elongation of the mandrels is arranged whereby the negative end surfaces of said at least first and second mandrels are substantially opposing.

5. The process of claim 4 wherein the axes of elongation of adjacent mandrels arc substantially parallel.

6. The process of claim 1 wherein each mandrel is of circular cross-section.

7. The process of claim 1 wherein the outer surfaces of said at least first and second mandrels are substantially conical.

8. The process of claim 7 wherein the outer surfaces define a cone angle of about 1 to about 5 degrees.

9. The process of claim 1 wherein the outer surfaces of said at least first and second mandrels are substantially cylindrical.

10. The process of claim 1 wherein the electroforming material in the electroforming bath has a different thermal coefficient of expansion to that of the mandrels.

11. The process of claim 1 wherein the intermediate mandrel includes one or more leaf portions, bent and attached to the first and second mandrels at least adjacent the ends thereof having the negative surfaces.

12. The process of claim 11 wherein the or each leaf portion comprises a portion formed from metal foil or plate, for example aluminum foil or plate.

13. The process of claim 1 wherein the intermediate mandrel includes a moldable and curable material, molded and attached to the first and second mandrels at least adjacent the ends thereof having the negative surfaces.

14. The process of claim 13 wherein the moldable material comprises a polymer or resin material containing conductive particles.

15. The process of claim 13 including coating a conductive film or layer onto the moldable material.

16. The process of claim 1 wherein the attachment member includes a locating member and (c) includes locating the first and second mandrels using the locating member.

17. The process of claim 16 wherein the attachment member includes a locking member, and (c) includes attaching the locking member to the locating member in releasable abutment.

18. The process of claim 1 wherein the first mandrel and/or the second mandrel are shaped such that the surfaces thereof upon which material is electroformed during said electroforming operation are substantially cylindrical or substantially conical.

19. The process of claim 1 wherein the first mandrel and/or the second mandrel arc shaped such that the negative surfaces thereof are piano, spherical, conical, general asphere, toroidal, a grating, or a fly eye mirror.

20. The process of claim 1 wherein each mandrel has an open end and, at the end thereof opposite said open end, a negative end surface defining in negative shape a reflective surface.

21. A reflective optical system obtained by a process for fabricating a reflective optical system, said process comprising:
(a) providing at least a first mandrel and a second mandrel, each mandrel having an axis of elongation and having at one end thereof a negative end surface defining in negative shape a reflective surface;
(b) providing an intermediate mandrel disposed between the first and second mandrels and extending between the ends thereof having said negative surfaces;
(c) rigidly and releasably attaching the first mandrel and the second mandrel to each other, thereby forming a mandrel assembly, the axes of said at least first and second mandrels being non-coincident;
(d) positioning the mandrel assembly in an electroforming bath and performing an electroforming operation for a predetermined period, thereby forming the optical system on the mandrel assembly; and
(e) separating the mandrel assembly from the optical system, the optical system thereby having at least first and second elongate hollow sections,
wherein each hollow section has an axis corresponding to the axis of elongation of a respective mandrel;
wherein each hollow section has a first end, at which a reflective surface corresponding to the negative end surface of a respective mandrel is disposed, and a second end, the second ends being open; and
wherein the axes of said at least first and second hollow section are oriented whereby an optical path is defined between said second ends via reflections at said reflective surfaces; and
whereby said optical system has an off-axis configuration and whereby said optical system includes an intermediate section extending between said first and second hollow sections and providing an optical path between said first and second reflective surfaces.

22. A reflective optical system, comprising:
at least first and second electroformed elongate hollow sections, each hollow section having an axis of elongation, and each hollow section having an open end and, at the end thereof opposite said open end, a reflective surface;
wherein the axes of said at least first and second and hollow sections are non-coincident; and
wherein the axes of said at least first and second hollow sections are oriented whereby an optical path is defined between said open ends via reflections at said reflective surfaces, and whereby said optical system has an off-axis configuration; and
an intermediate electroformed hollow section, connecting between said first and second hollow sections and providing said optical path between said first and second reflective surfaces.

23. The optical system of claim 22 wherein said at least first and second hollow sections are integrally electroformed.

24. The optical system of claim 22 wherein the intermediate electroformed hollow section is integrally electroformed with one or more of said at least first and second hollow sections.

25. The process of any of claim 22 wherein the orientations of hollow sections is reversed and the axes of elongation of the hollow sections is arranged whereby the reflective surfaces of said at least first and second hollow sections are substantially opposing.

26. The process of claim 25 wherein the axes of elongation of adjacent mandrels are substantially parallel.

27. The optical system of claim 23 wherein the hollow sections are each of circular cross-section.

28. The optical system of claim 27 wherein the first hollow section and/or the second hollow section is substantially conical.

29. The optical system of claim 27 wherein the first hollow section and/or the second hollow section have a cone angle of about 1 to about 5 degrees.

30. The optical system of claim 27 wherein the first hollow section and/or the second hollow section is substantially cylindrical.

31. The optical system of any of claim 22 wherein the reflective surface of said first hollow section and/or the reflective surface of said second hollow section is piano, spherical, conical, general asphere, toroidal or a grating.

32. The optical system of claim 22 wherein at least one of the reflective surfaces has a fly-eye mirror arrangement comprising multiple reflective portions.

* * * * *